United States Patent
Brähler et al.

(10) Patent No.: US 10,655,680 B2
(45) Date of Patent: May 19, 2020

(54) SEALING ARRANGEMENT

(71) Applicant: Schaeffler Technologies AG & Co. KG, Herzogenaurach (DE)

(72) Inventors: Simon Brähler, Petersberg (DE); Andreas Kaiser, Werneck (DE); Alexander Häpp, Hofheim/Lendershausen (DE); Marc-André Schäfer, Üchtelhausen (DE)

( * ) Notice: Subject to any disclaimer, the term of this patent is extended or adjusted under 35 U.S.C. 154(b) by 0 days.

(21) Appl. No.: 16/463,170

(22) PCT Filed: Aug. 24, 2017

(86) PCT No.: PCT/DE2017/100714
§ 371 (c)(1),
(2) Date: May 22, 2019

(87) PCT Pub. No.: WO2018/095454
PCT Pub. Date: May 31, 2018

(65) Prior Publication Data
US 2019/0345982 A1    Nov. 14, 2019

(30) Foreign Application Priority Data

Nov. 23, 2016   (DE) .................... 10 2016 013 956
Dec. 21, 2016   (DE) .................... 10 2016 125 121

(51) Int. Cl.
*F16J 15/16*       (2006.01)
*F16C 33/78*       (2006.01)
(Continued)

(52) U.S. Cl.
CPC ...... *F16C 33/7883* (2013.01); *B60B 27/0073* (2013.01); *F16C 33/726* (2013.01);
(Continued)

(58) Field of Classification Search
CPC ...... F16J 15/164; F16J 15/3496; F16J 15/453; F16J 15/324; F16J 15/3264;
(Continued)

(56) References Cited

U.S. PATENT DOCUMENTS 2,659,617 A * 11/1953 Cobb .................. F16C 33/7843
                                                                 277/376
2,890,086 A *  6/1959 Clark ..................... B61F 17/08
                                                                 384/173
(Continued)

FOREIGN PATENT DOCUMENTS

DE    102005055037 A1    5/2007
DE    112006001211 T5    4/2008
(Continued)

*Primary Examiner* — Alan B Waits
(74) *Attorney, Agent, or Firm* — Antun M. Peakovic

(57) ABSTRACT

A sealing arrangement for a wheel bearing having a first component against a second component which is rotatable relative thereto, the sealing arrangement having a first seal arranged on the first component and a second seal arranged on the second component, the first seal has at least one opening for the passage of air at least in a sealing chamber formed spatially between the two seals, and a fabric element is provided to at least partially expand upon contact with water and thereby to seal the at least one opening.

16 Claims, 1 Drawing Sheet

(51) Int. Cl.
  *B60B 27/00* (2006.01)
  *F16C 33/72* (2006.01)
  *F16J 15/324* (2016.01)
  *F16J 15/3264* (2016.01)
  *F16J 15/3284* (2016.01)
  *F16J 15/06* (2006.01)

(52) U.S. Cl.
  CPC ............. *F16C 33/78* (2013.01); *F16J 15/068* (2013.01); *F16J 15/164* (2013.01); *F16J 15/324* (2013.01); *F16J 15/3264* (2013.01); *F16J 15/3284* (2013.01); *B60B 2900/5114* (2013.01); *F16C 2212/08* (2013.01); *F16C 2326/02* (2013.01)

(58) Field of Classification Search
  CPC . F16J 15/3284; F16C 33/7883; F16C 33/726; F16C 2326/02; F16C 2212/08; B60B 27/0073; B60B 2360/00; B60B 2900/211; B60B 2900/212; B60B 2900/325; B60B 2900/5112; B60B 2900/5114; B60B 2900/513
  See application file for complete search history.

(56) References Cited

U.S. PATENT DOCUMENTS

| | | | | |
|---|---|---|---|---|
| 3,749,954 A | * | 7/1973 | Anderson, Jr. | ...... H02K 5/1677 310/90 |
| 4,428,630 A | * | 1/1984 | Folger | ................... F16C 19/386 277/552 |
| 4,433,846 A | * | 2/1984 | Romero | ............... F16J 15/3252 277/551 |

FOREIGN PATENT DOCUMENTS

| | | |
|---|---|---|
| DE | 102009050215 A1 | 5/2011 |
| DE | 102010055178 A1 | 6/2012 |
| DE | 102011076276 A1 | 11/2012 |
| DE | 102015220367 A1 | 8/2016 |
| JP | 2005121164 A | 5/2005 |

* cited by examiner

SEALING ARRANGEMENT

CROSS-REFERENCE TO RELATED APPLICATIONS

This application is the U.S. National Phase of PCT Appln. No. PCT/DE2018/095454 filed May 31, 2018 which claims priority to DE102016218450.4 filed Aug. 24, 2017, the entire disclosures of which are incorporated by reference herein.

TECHNICAL FIELD

The disclosure concerns a sealing arrangement for sealing a first component against a second component which is rotatable relative thereto. In particular, the disclosure concerns a sealing arrangement for a roller bearing.

BACKGROUND

In many applications, it is necessary to seal a roller bearing against environmental influences in order to ensure an adequate service life of the roller bearing.

For example, in wheel bearings for vehicles, it is essential to protect the roller bearings arranged in the wheel fixings against splash water and other contamination in daily use. Usually, contact seals are used for this purpose, which are known for example in the form of cassette seals which can be inserted in the roller bearing as a seal kit. The cassette seals usually contain one to two sealing lips arranged in the axial direction and one to two sealing lips lying touching each other in the radial direction.

DE 10 2009 050 215 A1 describes a sealing ring for sealing a roller space of a roller bearing. The sealing ring comprises a carrier part holding an elastic part and provided for fixing to a first bearing part. The sealing ring is provided for sealing, by means of a radial or axial sealing lip on the elastic part, the rolling space between the first bearing part and a second bearing part which is rotatable relative to the first bearing part, or between the first bearing part and another component attached to the second bearing part and movable relative to the first bearing part. The sealing lip is for this provided to form a gap with the second bearing part or with the component. Furthermore, the sealing lip has a ring groove for forming a lubricant ring closing the gap.

SUMMARY

The object of the present disclosure is to refine a sealing arrangement.

The sealing arrangement according to the disclosure for sealing a first component against a second component which is rotatable relative thereto comprises a first seal arranged on the first component and a second seal arranged on the second component, wherein the first seal has at least one opening for the passage of air at least in a sealing chamber formed spatially between the two seals, wherein an at least partially permeable fabric element is arranged on the at least one opening, wherein the fabric element is provided to at least partially expand upon contact with water and thereby to completely seal the at least one opening. In particular, the sealing arrangement is used in a wheel bearing for a vehicle.

In other words, the two seals form a sealing space which is connected to the environment via the at least one opening. Furthermore, not only is the sealing space connected to the environment, but also a bearing inner space is formed between two rows of roller bodies of the wheel bearing.

Through the at least one opening, it is possible to compensate for a lower or higher pressure in the bearing interior relative to the ambient pressure, since the air can escape from the bearing interior or flow into the bearing interior. This allows ventilation for pressure compensation in the wheel bearing. In particular, at least one opening for the passage of air may also be provided in at least one bearing ring of the wheel bearing, wherein the at least partially permeable fabric element is provided on the least one opening, wherein the fabric element is provided to at least partially expand on contact with water and thereby completely seal the at least one opening.

Thus it can be ensured that the seals which are intended to seal the bearing interior can function over the planned service life of the wheel bearing and not fail prematurely. In particular, due to the pressure balancing via the at least one opening, an increase in the coefficient of friction of the wheel bearing arrangement and the associated increased wear can be avoided.

The at least one opening is covered by the at least partially permeable fabric element. The term "at least partially permeable" means that, in a dry state, the fabric element allows the passage of air. In contrast, in a wet state, the fabric element expands and thereby prevents the passage of air, water and dirt. The term "water" generally means a liquid. In contrast to a membrane, the fabric element functions as an adaptive filter.

The fabric element is formed from a swelling fabric mesh with mesh openings, wherein the swelling fabric mesh swells by absorption of water and completely closes the mesh openings. A thickness of the fabric element may be designed application-specifically, in order to adapt an air passage resistance. In particular, in this way, a specific air pressure in the wheel bearing may be set. Furthermore, the respective mesh openings may be set variably. The larger the mesh openings, the greater the air permeability in the dry state of the fabric element. The fabric element can be formed from a woven hemp fabric.

According to an exemplary embodiment, the fabric element is connected by substance bonding to the first seal. For example, the fabric element may be glued to the first seal. Alternatively or additionally, the fabric element is connected by form fit to the first seal. In particular, a rebate is provided on the first seal to receive the fabric element.

The first seal comprises a carrier element and a sealing element, wherein at least the carrier element of the first seal is arranged on the first component. Furthermore, the second seal comprises at least one carrier element and optionally a sealing element, wherein the carrier element of the second seal is arranged on the second component and the sealing element of the first seal comes to rest sealingly on the carrier element of the second seal. The respective sealing element is formed in particular from an elastic material, preferably an elastomer. Furthermore, the respective carrier element has a higher strength and stiffness than the respective sealing element. For example, the respective carrier element is formed from a metal sheet. In particular, the respective sealing element is molded around the respective carrier element.

The disclosure includes the technical teaching that the first seal is configured as a multilip seal. Seals with three lips are used in vehicles. Furthermore, it is however also possible to configure the first seal as a monolip seal. Alternatively or additionally, it is however also conceivable to use a splash plate on the sealing arrangement, which guarantees additional protection from water, dirt and dust.

BRIEF DESCRIPTION OF THE DRAWINGS

Further measures improving the invention are explained below in relation to the description of two preferred exemplary embodiments of the disclosure and with reference to the attached two figures. The drawings show.

DETAILED DESCRIPTION

Figure 1:
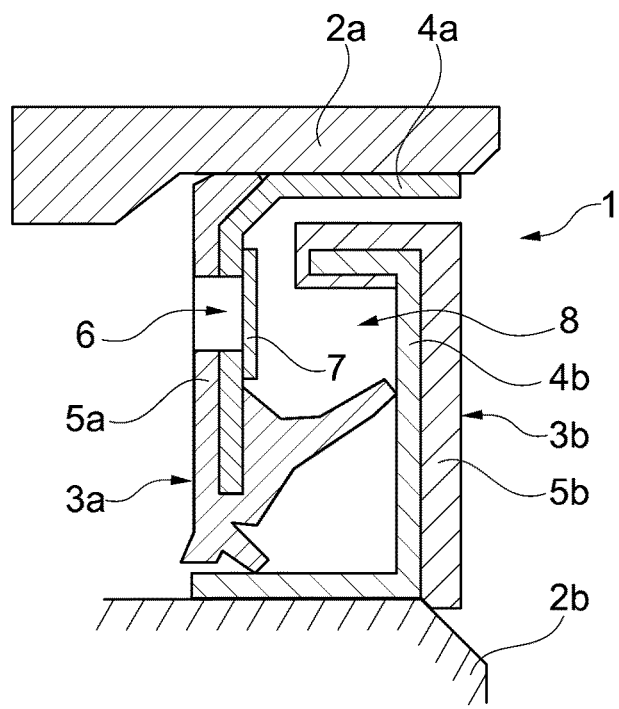
FIG. 1 a diagrammatic, sectional depiction to illustrate the structure of the sealing arrangement according to the disclosure according to a first exemplary embodiment, and FIG. 2 a diagrammatic, sectional depiction to illustrate the structure of a sealing arrangement according to the disclosure according to a second exemplary embodiment.
Figure 2:
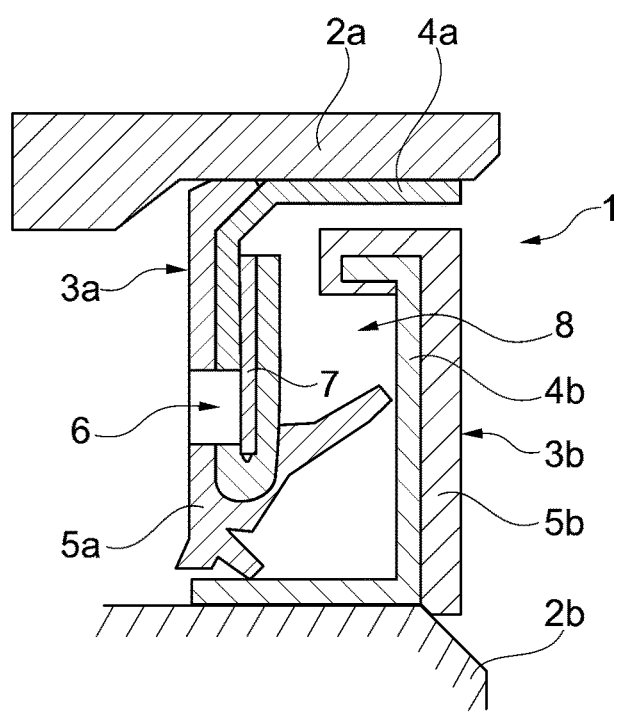

According to FIGS. 1 and 2, the respective sealing arrangement 1 according to the invention, for sealing a first component 2a against a second component 2b which is rotatable relative thereto, comprises a first seal 3a arranged on the first component 2a and a second seal 3b arranged on the second component 2b. The first component 2a is formed as the outer ring of a wheel bearing (not shown here), wherein the second component is formed as the inner ring of the wheel bearing. The first seal 3a is configured as a multilip seal. The first seal 3a furthermore comprises a carrier element 4a and a sealing element 5a, wherein the carrier element 4a of the first seal 3a is arranged on the first component 2a. Furthermore, the carrier element 4a of the first seal 3a is substantially surrounded by the sealing element 5a of the first seal 3a, wherein the sealing element 5a of the first seal 3a partially comes to rest on the first component 2a. In contrast, the second seal 3b comprises a carrier element 4b, wherein the carrier element 4b of the second seal 3b is arranged on the second component 2b. The sealing element 5a of the first seal 3a comes to rest sealingly on the carrier element 4b of the second seal 3b.

According to FIG. 1, the first seal 3a has a opening 6 for the passage of air in a sealing space 8 formed spatially between the two seals 3a, 3b. The opening 6 extends through both the carrier element 4a and the sealing element 5a of the first seal 3a. The opening 6 is covered by an at least partially permeable fabric element 7 which is arranged in the sealing space 8 and connected to the carrier element 4a of the first seal 3a.

According to FIG. 2, the first seal 3a has a opening 6 for the passage of air in a sealing space 8 formed spatially between the two seals 3a, 3b. The opening 6 extends through both the carrier element 4a and the sealing element 5a of the first seal 3a. Furthermore, the carrier element 4a of the first seal 3a is bent such that a rebate is formed between two legs of the carrier element 4a of the first seal 3a. An at least partially permeable fabric element 7 is arranged in the rebate and completely covers the opening 6. Thus the fabric element 7 is connected by form fit to the first seal 3a.

The respective fabric element 7 according to FIGS. 1 and 2 is provided to at least partially expand on contact with water and thereby completely seal the opening 6. The respective fabric element 7 in dry state allows a passage of air, wherein in a wet state of the respective fabric element 7, neither air nor water can penetrate through the respective fabric element 7. The respective fabric element 7 is formed from a swelling fabric mesh with mesh openings, wherein the swelling fabric mesh swells by absorption of water and completely closes the mesh openings so as to be air-tight and water-tight. Furthermore, the respective fabric element 7 is configured as a woven hemp fabric.

LIST OF REFERENCE SKINS

1 Sealing arrangement
2a, 2b Component
3a, 3b Seal
4a, 4b Carrier element
5a, 5b Sealing element
6 Opening
7 Fabric element
8 Sealing space

The invention claimed is:

1. A sealing arrangement for sealing a first component against a second component which is rotatable relative thereto, comprising:
  a first seal arranged on the first component; and
  a second seal arranged on the second component;
  wherein the first seal has at least one opening for passage of air at least in a sealing chamber formed spatially between the two seals;
  wherein an at least partially permeable fabric element is arranged on the at least one opening;
  wherein the fabric element is provided to at least partially expand upon contact with water and thereby to completely seal the at least one opening.

2. The sealing arrangement of claim 1,
  wherein the fabric element is formed from a swelling fabric mesh with mesh openings, wherein the swelling fabric mesh swells by absorption of water and closes the mesh openings.

3. The sealing arrangement of claim 1,
  wherein the fabric element is formed from a woven hemp fabric.

4. The sealing arrangement of claim 1,
  wherein the fabric element is connected by substance bonding to the first seal.

5. The sealing arrangement of claim 1,
  wherein the fabric element is connected by form fit to the first seal.

6. The sealing arrangement of claim 1,
  wherein the first seal has a carrier element and a sealing element, wherein at least the carrier element of the first seal is arranged on the first component.

7. The sealing arrangement of claim 1,
  wherein the second seal has at least one carrier element and optionally a sealing element wherein the carrier element of the second seal is arranged on the second component and the sealing element of the first seal comes to rest sealingly on the carrier element of the second seal.

8. The sealing arrangement of claim 1,
  wherein the first seal is configured as a multilip seal.

9. A wheel bearing for a vehicle comprising:
  an inner ring;
  an outer ring;
  rolling elements arranged between the inner and outer rings;
  a first seal arranged on the outer ring and
  a second seal arranged on inner ring;
  wherein the first seal has at least one opening for passage of air at least in a sealing chamber formed spatially between the two seals;
  wherein an at least partially permeable fabric element is arranged on the at least one opening;

wherein the fabric element is provided to at least partially expand upon contact with water and thereby to completely seal the at least one opening.

10. The wheel bearing of claim 9,
wherein the fabric element is formed from a swelling fabric mesh with mesh openings, wherein the swelling fabric mesh swells by absorption of water and closes the mesh openings.

11. The wheel bearing of claim 9,
wherein the fabric element is formed from a woven hemp fabric.

12. The wheel bearing of claim 9,
wherein the fabric element is connected by substance bonding to the first seal.

13. The wheel bearing of claim 9,
wherein the fabric element is connected by form fit to the first seal.

14. The wheel bearing of claim 9,
wherein the first seal has a carrier element and a sealing element, wherein at least the carrier element of the first seal is arranged on the first component.

15. The wheel bearing of claim 9,
wherein the second seal has at least one carrier element and optionally a sealing element,
wherein the carrier element of the second seal is arranged on the second component and the sealing element of the first seal comes to rest sealingly on the carrier element of the second seal.

16. The wheel bearing of claim 9,
wherein the first seal is configured as a multilip seal.

* * * * *